(12) United States Patent
Xia et al.

(10) Patent No.: US 11,856,071 B2
(45) Date of Patent: Dec. 26, 2023

(54) METHOD AND APPARATUS FOR PUSHING SUBSCRIPTION DATA IN INTERNET OF THINGS, DEVICE AND STORAGE MEDIUM THEREOF

(71) Applicants: ENVISION DIGITAL INTERNATIONAL PTE. LTD., Singapore (SG); SHANGHAI ENVISION DIGITAL CO., LTD., Shanghai (CN)

(72) Inventors: Yuanyuan Xia, Shanghai (CN); Xiaomin Zhou, Shanghai (CN)

(73) Assignees: ENVISION DIGITAL INTERNATIONAL PTE. LTD., Singapore (SG); SHANGHAI ENVISION DIGITAL CO., LTD., Shanghai (CN)

( * ) Notice: Subject to any disclaimer, the term of this patent is extended or adjusted under 35 U.S.C. 154(b) by 0 days.

(21) Appl. No.: 17/789,249

(22) PCT Filed: Dec. 22, 2020

(86) PCT No.: PCT/SG2020/050768
§ 371 (c)(1),
(2) Date: Jun. 27, 2022

(87) PCT Pub. No.: WO2021/133251
PCT Pub. Date: Jul. 7, 2021

(65) Prior Publication Data
US 2022/0400164 A1   Dec. 15, 2022

(30) Foreign Application Priority Data
Dec. 26, 2019 (CN) .......................... 201911370689.6

(51) Int. Cl.
G06F 15/16 (2006.01)
H04L 67/55 (2022.01)
G06F 16/9035 (2019.01)

(52) U.S. Cl.
CPC .......... *H04L 67/55* (2022.05); *G06F 16/9035* (2019.01)

(58) Field of Classification Search
CPC .............................. H04L 67/55; G06F 16/9035
See application file for complete search history.

(56) References Cited

U.S. PATENT DOCUMENTS 10,104,173 B1 * 10/2018 Gorelik .................. A63F 13/49
10,791,421 B1 *  9/2020 Rothschild .......... G06F 16/9537
(Continued)

FOREIGN PATENT DOCUMENTS

| CN | 108197138 A | 6/2018 |
| CN | 108566299 A | 9/2018 |

(Continued)

OTHER PUBLICATIONS

International Search Report and Written Opinion of International Searching Authority dated Mar. 2, 2021 for International Application No. PCT/SG2020/050768.
(Continued)

*Primary Examiner* — Oleg Survillo
(74) *Attorney, Agent, or Firm* — JCIP; Joseph G. Chu; Jeremy I. Maynard (57) ABSTRACT

The present disclosure relates to a method and apparatus for pushing subscription data in Internet of things. The method includes: parsing a subscription condition set into a first attribute set in response to receiving the subscription condition set; acquiring device data; parsing the device data into a second attribute set; performing Bloom filtering on attribute elements in the second attribute set one by one in a
(Continued)

predetermined order by taking an attribute element set in the first attribute set as a filter condition; stopping the Bloom filtering on the other attribute elements in the second attribute set in the case that a Bloom filtering result of one attribute element indicates an occurrence of mismatch; and returning to the step of acquiring the device data.

8 Claims, 7 Drawing Sheets

(56) References Cited

U.S. PATENT DOCUMENTS

| | | | |
|---|---|---|---|
| 10,860,604 B1* | 12/2020 | Pandey | G06F 11/1402 |
| 2002/0016839 A1* | 2/2002 | Smith | G06Q 40/00 |
| | | | 709/224 |
| 2004/0181588 A1* | 9/2004 | Wang | H04L 9/40 |
| | | | 709/207 |
| 2010/0269024 A1* | 10/2010 | Hao | H03M 13/51 |
| | | | 714/752 |
| 2010/0281150 A1* | 11/2010 | Sailhan | H04L 41/0631 |
| | | | 709/238 |
| 2013/0031367 A1* | 1/2013 | Mao | H04L 63/10 |
| | | | 713/168 |
| 2015/0012564 A1 | 1/2015 | Litherland et al. | |
| 2017/0215064 A1* | 7/2017 | Onishi | H04W 4/70 |
| 2019/0095448 A1 | 3/2019 | Kvalnes et al. | |
| 2019/0349426 A1* | 11/2019 | Smith | H04L 9/0825 |
| 2021/0076099 A1* | 3/2021 | Ganschow | H04N 21/222 |

FOREIGN PATENT DOCUMENTS

| | | |
|---|---|---|
| CN | 110287406 A | 9/2019 |
| KR | 101837184 B1 | 3/2018 |

OTHER PUBLICATIONS

IPRP of PCT/SG2020/050768 dated Jan. 7, 2022.

Notice of Preliminary Rejection dated Sep. 5, 2022 from the Korean Intellectual Property Office for Korean Application No. 10-2022-7024927.

Examination Report No. 1 dated Mar. 9, 2023 for Australian Application No. 2020414275.

Substantive Examination Adverse Report dated Jan. 30, 2023 for Malaysian Application No. PI 2022003397.

Notice of Reasons for Refusal dated Jan. 19, 2023 for Japanese Application No. 2022-539032.

Notice of Allowance dated Dec. 2, 2022 from the Korean Intellectual Property Office for Korean Application No. 10-2022-7024927.

John W Byers et al: "Informed content delivery across adaptive overlay networks", IEEE/ACM Transactions on Networking, IEEE/ACM, New York, NY, US, vol. 12, No. 5, Oct. 1, 2004 (Oct. 1, 2004), pp. 767-780, XP058303366, ISSN: 1063-6692, DOI:10.1109/TNET.2004.836103 * section "VI. Fine-Grained Reconciliation", subsection "A. Enumeration-Based Approaches" abstract.

Shukla Anshu et al: "Benchmarking Distributed Stream Processing Platforms for IoT Applications", Feb. 18, 2017 (Feb. 18, 2017), Sat 2015 18th International Conference, Austin, TX, USA, Sep. 24-27, 2015; [ Lecture Notes in Computer Science; Lect.Notes Computer], Springer, Berlin, Heidelberg, pp. 90-106, XP047407309, ISBN: 978-3-540-74549-5 [retrieved on Feb. 18, 2017] * section 3.3 Categories of IoT Tasks and Applications abstract.

Sebestyen Gheorghe et al: "Bloom filters for information retrieval in the context of IoT", 2016 IEEE International Conference on Automation, Quality and Testing, Robotics (AQTR), IEEE, May 19, 2016 (May 19, 2016), pp. 1-6, XP032917283, DOI: 10.1109/AQTR.2016.7501349 [retrieved on Jun. 27, 2016] the whole document.

Extended European Search Report dated Dec. 12, 2022 for European Application No. 20905114.3.

Notice for Eligibility of Grant with Examination Report dated Apr. 13, 2023 for Singaporean Application No. 11202250769C.

Examination Report dated Aug. 8, 2023 for Canadian Application No. 3166090.

Decision of Refusal dated Jul. 3, 2023 for Japanese Application No. 2022-539032.

* cited by examiner

| 0 | 0 | 0 | 0 | 0 | 0 | 0 | 0 | 0 | 0 |
|---|---|---|---|---|---|---|---|---|---|
| 9 | 8 | 7 | 6 | 5 | 4 | 3 | 2 | 1 | 0 |
| 0 | 0 | 0 | 0 | 0 | 0 | 0 | 0 | 0 | 0 |
| 19 | 18 | 17 | 16 | 15 | 14 | 13 | 12 | 11 | 10 |

FIG. 4

| 1 | 1 | 1 | 0 | 0 | 1 | 1 | 0 | 0 | 0 |
|---|---|---|---|---|---|---|---|---|---|
| 9 | 8 | 7 | 6 | 5 | 4 | 3 | 2 | 1 | 0 |
| 0 | 0 | 0 | 1 | 1 | 0 | 0 | 0 | 1 | 1 |
| 19 | 18 | 17 | 16 | 15 | 14 | 13 | 12 | 11 | 10 |

METHOD AND APPARATUS FOR PUSHING SUBSCRIPTION DATA IN INTERNET OF THINGS, DEVICE AND STORAGE MEDIUM THEREOF

TECHNICAL FIELD

The present disclosure relates to the technical field of Internet of things, and in particular relates to a method and apparatus for pushing subscription data in Internet of things, and a device and a storage medium thereof.

BACKGROUND

With the large-scale application of the Internet of things technology, information interactions between things and things and between people and things are more frequent, and during the process of pushing subscription data, data in a subscription server needs to be matched according to a subscription condition.

In the related art, data in a database is generally matched with the subscription condition, and upon the matching, whether the data is to be sent to users is determined depending on whether or not the data meets the subscription condition.

In the related art, since different attribute values are generally included in a data structure, it is of no significance to match other attribute values of the data if it is determined that a specific attribute value of the data does not meet the subscription condition. As a result, matching resources of the subscription server are wasted, and matching efficiency of the subscription server is lowered.

SUMMARY

Embodiments of the present disclosure provide a method and apparatus for pushing subscription data in Internet of things, and a computer device and a non-transitory computer-readable storage medium thereof, which can reduce waste of verification resources in the verification process and thereby improve verification efficiency.

In one aspect, a method for pushing subscription data in Internet of things is provided. The method is performed by a subscription server, and includes:

parsing a subscription condition set into a first attribute set in response to receiving the subscription condition set, wherein the first attribute set includes at least one attribute element set, and the subscription condition set includes at least one subscription condition;

acquiring device data, wherein the device data is stored in the subscription server;

parsing the device data into a second attribute set, wherein attribute elements in the second attribute set are of the same type as the attribute element set in the first attribute set;

performing Bloom filtering on the attribute elements in the second attribute set one by one in a predetermined order by taking the attribute element set in the first attribute set as a filter condition;

stopping the Bloom filtering on the other attribute elements in the second attribute set in the case that a Bloom filtering result of one of the attribute elements in the second attribute set indicates a mismatch with the corresponding attribute element set in the first attribute set; and returning to the step of acquiring the device data.

In another aspect, an apparatus for pushing subscription data in Internet of things is provided. The apparatus is applicable to a subscription server, and includes:

a first parsing module, configured to parse a subscription condition set into a first attribute set in response to receiving the subscription condition set, wherein the first attribute set includes at least one attribute element set, and the subscription condition set includes at least one subscription condition;

an acquiring module, configured to acquire device data, wherein the device data is stored in the subscription server;

a second parsing module, configured to parse the device data into a second attribute set, wherein attribute elements in the second attribute set are of the same type as the attribute element set in the first attribute set;

a Bloom filtering module, configured to perform Bloom filtering on the attribute elements in the second attribute set one by one in a predetermined order by taking the attribute element set in the first attribute set as a filter condition;

a stopping module, configured to stop the Bloom filtering on the other attribute elements in the second attribute set in the case that a Bloom filtering result of one of the attribute elements in the second attribute set indicates a mismatch with the corresponding attribute element set in the first attribute set; and a returning module, configured to return to the step of acquiring the device data.

In some embodiments, the Bloom filtering module includes:

a first calculating submodule, configured to acquire a binary vector set corresponding to the attribute element set in the first attribute set by performing a Hash operation on attribute values of the attribute elements in the first attribute set respectively; and a second calculating submodule, configured to acquire a binary vector corresponding to the attribute elements in the second attribute set by performing a Hash operation on attribute values of the attribute elements in the second attribute set respectively;

wherein the stopping module is further configured to stop the Bloom filtering on the other attribute elements in the second attribute set in the case that one of the binary vectors corresponding to the attribute elements in the second attribute set fails to match one of the binary vector sets corresponding to the attribute elements in the first attribute set.

In some embodiments, in the case that a number of the subscription condition is 1, the apparatus further includes:

a first transmitting module, configured to transmit the device data to a client in the case that the Bloom filtering result of the attribute elements in the second attribute set indicates a corresponding match with the attribute element set in the first attribute set, wherein the client is a terminal for transmitting the subscription condition.

In some embodiments, in the case that the number of subscription conditions is greater than 1, the apparatus further includes:

a calculating module, configured to acquire a unified subscription condition by intersecting the subscription condition sets corresponding to the attribute elements that are successfully matched in the case that the Bloom filtering result of the attribute elements in the second attribute set indicates a successful corresponding match with the attribute element set in the first attribute set;

a matching module, configured to acquire a matching result by matching an attribute set corresponding to the unified subscription condition with the second attribute set; and a second transmitting module, configured to transmit the device data to the client in response to the matching result indicating that the second attribute set is successfully matched with the attribute set corresponding to the unified subscription condition.

In some embodiments, the calculating module is configured to acquire the unified subscription condition by intersecting the subscription condition sets corresponding to the attribute elements which are successfully matched in the first attribute sets in the case that the binary vector set corresponding to the attribute element set in the first attribute set is successfully matched with the binary vector corresponding to the attribute elements in the second attribute set.

In some embodiments, the attribute element set in the first attribute set is at least one of a model, a device, and a measurement point.

In another aspect, a computer device is provided. The computer device includes a processor and a memory storing at least one instruction, at least one program, a code set, or an instruction set therein. The at least one instruction, the at least one program, the code set, or the instruction set, when loaded and executed by the processor, causes the processor to perform the method for pushing subscription data in Internet of things.

In another aspect, a non-transitory computer-readable storage medium storing at least one instruction, at least one program, a code set, or an instruction set is provided. The at least one instruction, the at least one program, the code set, or the instruction set, when loaded and executed by a processor of a computer device, causes the computer device to perform the method for pushing subscription data in Internet of things.

The technical solutions according to the present disclosure may achieve following beneficial effects.

When a subscription condition set is received, the subscription condition set is parsed into a first attribute set, and the device data is acquired and parsed into a second attribute set that has the same type of attribute elements as the attribute element set in the first attribute set. Then, Bloom filtering is performed on the attribute elements in the second attribute set one by one in a predetermined order by taking an attribute element set in the first attribute set as a filter condition, and the Bloom filtering on the other attribute elements in the second attribute set is stopped in the case that a Bloom filter result of one of the attribute elements in the second attribute set indicates a mismatch with the corresponding attribute element set in the first attribute set. At this point, the step of acquiring the device data is returned. In this way, the matching of the device data with the subscription condition set is performed according to the attribute elements during the process of pushing the subscription data, such that the matching of the device data is stopped in the case that one attribute element fails to meet the subscription condition set, which can reduce waste of matching resources of the subscription server and thereby improve matching efficiency of the subscription server.

It is to be understood that both the foregoing general description and the following detailed description are exemplary and explanatory only but are not intended to limit the present disclosure.

BRIEF DESCRIPTION OF THE DRAWINGS

The drawings herein are incorporated in and constitute a part of the specification. They show the embodiments consistent with the present disclosure and are used in conjunction with the specification to explain the principles of the present disclosure.

DETAILED DESCRIPTION

Reference is now made in detail to exemplary embodiments, examples of which are illustrated in the accompanying drawings. The following description refers to the accompanying drawings in which the same numbers in different drawings represent the same or similar elements unless otherwise represented. The embodiments set forth in the following description of exemplary embodiments do not represent all embodiments consistent with the present disclosure. Instead, they are merely examples of apparatuses and methods consistent with aspects related to the present disclosure as recited in the appended claims.

It should be understood that the term "several" used in the present disclosure means one or more in number, the term "a plurality of" means two or more in number, and the term "and/or" describes the association relationship between the associated objects and indicates that three relationships may be present. For example, A and/or B may indicate three cases where only A exists, A and B exist at the same time, and only B exists. In addition, the character "/" generally indicates an "OR" relationship is present between the former and later associated objects.

With the large-scale popularization of the Internet of things technology, a higher requirement is put forward to the accuracy in the subscription condition and the data matching in the subscription server during the process of pushing the subscription condition. The present disclosure provides a method for pushing subscription data in Internet of things, which can reduce waste of matching resources of the subscription server and thereby improve matching efficiency of the subscription server. For ease of understanding, several terms involved in the present disclosure are explained hereinafter.

1) Internet of Things (IoT)

The IoT is a network allowing all ordinary objects having independent functions to be connected based on information carriers such as the Internet and the traditional telecommunications networks, and is mainly applicable to the fields of transportation and logistics, industrial manufacturing, health care, smart environment (home, office, or factory), and the like. Therefore, the IoT has a great prospect in the market.

2) Bloom Filter

The Bloom filter is composed of a very long binary vector and a series of random mapping functions, and may be used to retrieve whether an element is in a set. Its advantage lies in that the Bloom filter has a higher space efficiency and a short query time than a common algorithm, and its disadvantage lies in that the Bloom filter has a specific misrecognition rate (that is, false positives, which mean that the Bloom filter may report the presence of an element in a set, contradicting with the fact that the element is not in the set) and deletion difficulty, but causes no recognition error situation (that is, false negatives, which mean that the Bloom filter may not report the presence of an element in a set if the element is not in the set, thereby preventing the underreport).

Referring to FIG. 1 to FIG. 6, schematic diagrams of workflow of a Bloom filter are illustrated. As shown in FIG. 1 to FIG. 6, by taking a uniform resource locator (URL) as an example, the Bloom filtering performed on the URL may be as follows.

Figure 1:
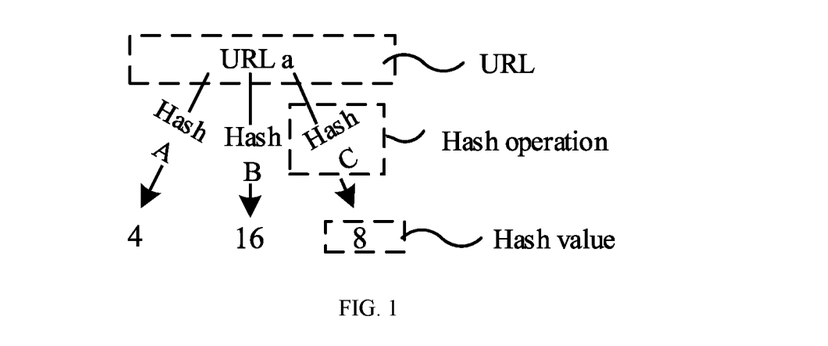
FIG. 1 to FIG. 6 are schematic diagrams of workflow of a Bloom filter.
Figure 2:
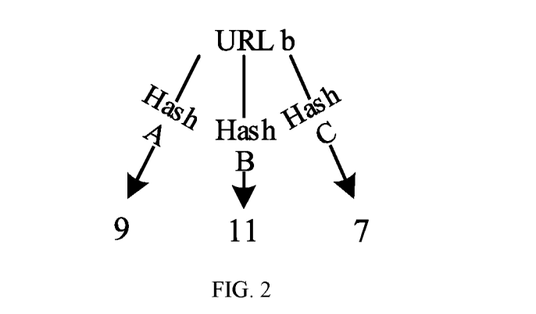
Figure 3:
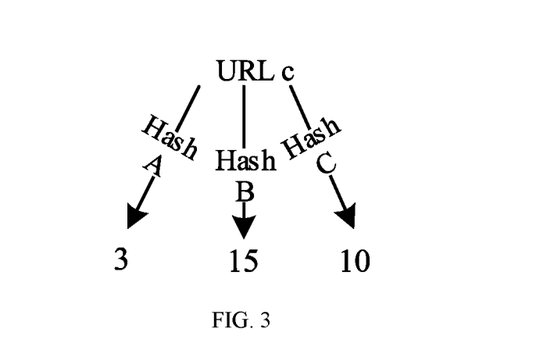

(1) By taking first, second, and third URLs as the filter conditions, three different Hash values may be generated according to three different Hash functions respectively.

As shown in FIG. 1 to FIG. 3 that are schematic diagrams of performing the Hash operation on URL a, URL b, and URL c, the three different Hash functions are Hash A, Hash B, and Hash C respectively. In addition, the three Hash values corresponding to URL a are 4, 16, and 8, the three Hash values of URL b are 9, 11, and 7, and the three Hash values corresponding to URL c are 3, 15, and 10.

Figure 4:
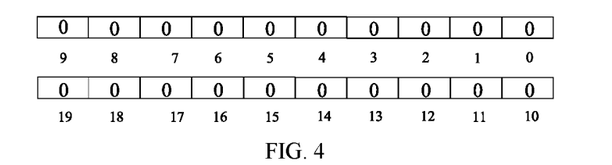

(2) The filter condition is mapped to an empty bitmap set.

Figure 5:
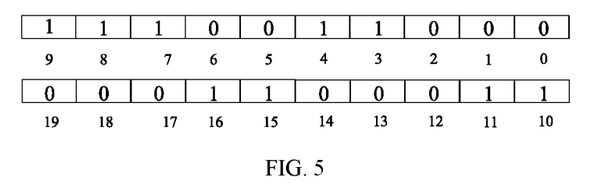

FIG. 4 shows an empty bitmap set. Since the three Hash values corresponding to the URL a are 4, 16, and 8, it is judged that the corresponding positions of 4, 16, and 8 in the bitmap set are 1, and thus the corresponding positions of 4, 16, and 8 are set to 1. Since the three Hash values corresponding to the URL b are 9, 11, and 7, it is judged that the corresponding positions of 9, 11, and 7 in the bitmap set are 1, and thus the corresponding positions of 9, 11, and 7 are set to 1. Since the three Hash values corresponding to the URL c are 3, 15, and 10, it is judged that the corresponding positions of 3, 15, and 10 in the bitmap set are 1, and thus the positions corresponding to 3, 15, and 10 are set to 1. FIG. 5 shows the bitmap set after completion of the setting.

Figure 6:
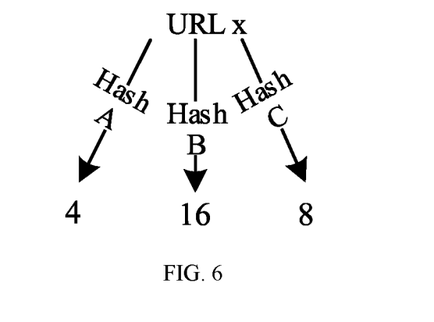

(3) When a fourth URL is added to the Bloom filter, the Hash operation is performed on the fourth URL according to the three Hash functions with the same Bloom filter condition to respectively generate three different Hash values.

As shown in FIG. 6, the Hash values corresponding to the fourth URL x are 4, 16, and 8.

(4) Whether the positions corresponding to the Hash values of the fourth URL in the bitmap set after the setting are 1 or not is judged. If the positions of the three values are simultaneously 1, it is determined that the URL is a duplicate URL; and if the positions of the three values are not simultaneously 1, it is determined that the URL is not a duplicate URL.

By making the three Hash values 4, 16, and 8 generated by the fourth URL x shown in FIG. 6 correspond to the bitmap set in FIG. 5, if the positions of 4, 16, and 8 are simultaneously 1, it is determined that the URL x shown in FIG. 6 is a duplicate URL, and the URL x is duplicate with the URL a.

When it is determined that the fourth URL is not a duplicate URL, the corresponding positions of the three Hash values of the URL in the bitmap set, which are not set to 1, are set to 1 and taken as a next Bloom filter condition for performing the Bloom filtering on the next URL.

The size of the bitmap set is not limited to the size of the set shown in the aforesaid figures, and the size corresponding to each position in the bitmap set is 1 bit. The user may make corresponding settings according to different needs, and the set-to-1 operation can be performed only once for each position in the bitmap set.

In some embodiments, the Bloom filter is configured to judge whether the subscription data meets the subscription condition or not. The subscription condition is split into attribute sets, and the attribute sets are taken as the Bloom filter condition to perform the Hash operation and mapped to the bitmap set. Herein, the Hash algorithm adopted in the Hash operation corresponding to different attributes may be the same or not. The subscription data is split into attribute sets newly corresponding to the subscription condition, and the Hash operation is performed on different attributes in the subscription data according to the Hash algorithm correspondingly adopted in the Hash operation performed on the different attributes in the subscription condition. Then, whether the subscription data meets the subscription condition or not is judged depending on whether the positions corresponding to the Hash values for different attributes of the same subscription data in the bitmap set are all set to 1 or not. If all the positions corresponding to the Hash values for different attributes of the same subscription data in the bitmap set are set to 1, the subscription data meets the subscription condition, and if not all the positions corresponding to the Hash values for different attributes of the same subscription data in the bitmap set are set to 1, the subscription data fails to meet the subscription condition.

Figure 7:
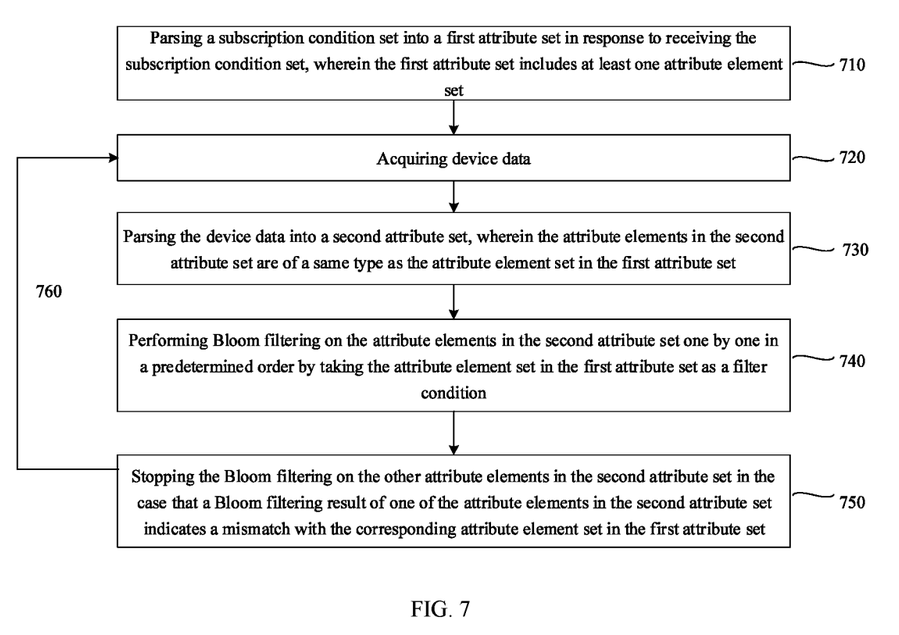
FIG. 7 is a flow chart of a method for pushing subscription data in Internet of things according to an exemplary embodiment of the present disclosure.

Referring to FIG. 7, a flowchart of a method for pushing subscription data in IoT according to an exemplary embodiment of the present disclosure is illustrated. The method for pushing subscription data in IoT is performed by the subscription server. As shown in FIG. 7, the method may include following steps.

In step 710, a subscription condition set is parsed into a first attribute set in response to receiving the subscription condition set. The first attribute set includes at least one attribute element set, and the subscription condition set includes at least one subscription condition.

The subscription condition refers to a customized condition for filtering the subscription data in the subscription server. The subscription condition may be defined by the user by inputting the customized condition into the subscription server or may be defined by the user by controlling a label control in the subscription server.

In some embodiments, in a possible situation, the client may have a search box, and the user may input text by an external device connected to the client to transmit the customized condition to the subscription server. Alternatively, under a premise that the client has a voice recognition function, the user may transmit the customized condition to the subscription server by voice input. Alternatively, the client may be provided with label controls for filtering the subscription data. For example, the label controls, such as a model a, a device B, or a measurement point C, may be displayed on a touch interface of the subscription server, and the label controls include descriptions of corresponding subscription data, such that the user may transmit the customized condition to the subscription server by a single selection or multiple selections.

In some embodiments, the subscription condition may include a sub-subscription condition for filtering at least one attribute. For example, the customized condition input by the user is "an electric lamp with IoT function." The customized condition may be parsed into different attribute sets in the subscription server, and the attribute set may be the series number that identifies the electric lamp, the model corresponding to the electric lamp, the corresponding measurement points in the model, or other related contents. For different attribute elements in the attribute set, corresponding sub-subscription conditions are defined to explain or restrict the different attribute elements. For example, a measurement point A corresponding to the parsed condition of "an electric lamp with the IoT function" may have attribute values for explaining the current or voltage of the electric lamp model.

In some embodiments, in the process of parsing the subscription condition set, each subscription condition in the subscription condition set shall be associated with the corresponding parsing result. That is, each subscription condition has a first attribute subset corresponding thereto, and the first attribute subset is in the first attribute set. For example, a subscription condition 1 may have a first attribute subset 1 corresponding thereto, and the first attribute subset 1 may include corresponding attribute elements, such as a model 1, a device 1, a measurement point 1, and the like.

In step 720, the device data is acquired, wherein the device data is stored in the subscription server.

The subscription server is connected to a data generating device that may transmit the generated device data to the subscription server. Upon receiving the subscription condition, the subscription server may extract the device data from the device data stored therein.

In step 730, the device data is parsed into a second attribute set. The attribute elements in the second attribute set are of the same type as the attribute element set in the first attribute set.

After the device data is acquired, the device data may be parsed according to the parsing rule of the subscription condition. For example, if the subscription condition is parsed into an attribute set composed of three attribute elements that are device, model and measurement point, the device data shall also be parsed according to the same parsing rule and thereby parsed into an attribute set composed of three attribute elements that are device, model and measurement point, such that the comparability between the data can be ensured.

In step 740, the Bloom filtering is performed on the attribute elements in the second attribute set one by one in a predetermined order by taking the attribute element set in the first attribute set as a filter condition.

The process may be that the Bloom filtering is performed on attribute values of the attribute elements in the second attribute set one by one in the predetermined order based on attribute values of the attribute element set in the first attribute set, and when the Bloom filtering result of the previous attribute elements in the second attribute set indicate a successful matching, the Bloom filtering of the next attribute elements is performed. For example, if the predetermined matching order is model, device, and measurement point, the attribute values of the model in the attribute set of the subscription condition may be firstly taken as the filter condition to perform the Bloom filtering on the attribute values of the model in the attribute set of the device data. When the Bloom filtering result of the attribute values of the model indicates a successful matching, the Bloom filtering is performed on the attribute values of the device in the attribute set of the device data by taking the attribute values of the device in the attribute set of the subscription condition as the filter condition. When the Bloom filtering result of the attribute values of the device indicates a successful matching, the attribute values of the measurement point in the attribute set of the subscription condition is taken as the filter condition to perform the Bloom filtering on the attribute values of the measurement point.

In step 750, the Bloom filtering on the other attribute elements in the second attribute set is stopped in the case that a Bloom filtering result of one of the attribute elements in the second attribute set indicates a mismatch with the corresponding attribute element set in the first attribute set.

During the matching process of the device data, as long as a Bloom filtering result of the attribute values of the attribute elements indicates a mismatch with the attribute values of the corresponding attribute elements in the subscription condition set, it may be determined that the device data fails to meet the subscription condition and it is meaningless to perform the Bloom filtering on attribute values of other attribute elements. Thus, when the Bloom filtering result of the attribute values of the attribute elements indicates the mismatch with the attribute values of the attribute elements in the subscription condition set, the subsequent Bloom filtering on the other attribute elements may be stopped, which can reduce waste of matching resources in the matching process.

In step 760, the process returns to the step of acquiring the device data.

During the process of pushing the subscription data, when it is determined that a certain device data fails to meet any subscription condition in the subscription condition set, it is necessary to stop matching the device data with the subscription condition and start matching the next device data with the subscription condition, so as to acquire at least one piece of device data in the subscription server that meets at least one subscription condition in the subscription condition set.

In some embodiments, when no device data in the subscription server meets a subscription condition in the subscription condition set, it may be judged that the subscription condition is illegal, and the judgment result is fed back to the client that transmits the subscription condition.

In summary, according to the method for pushing subscription data in IoT provided by the embodiment of the present disclosure, when a subscription condition set is received, the subscription condition set is parsed into a first attribute set, and the device data is acquired and parsed into a second attribute set that has the same type of attribute elements as the attribute element set in the first attribute set. Then, the Bloom filtering is performed on the attribute elements in the second attribute set one by one in a predetermined order by taking an attribute element set in the first attribute set as a filter condition, and the Bloom filtering on the other attribute elements in the second attribute set is stopped in the case that a Bloom filter result of one of the attribute elements in the second attribute set indicates a mismatch with the corresponding attribute element set in the first attribute set. At this point, the step of acquiring the device data is returned. In this way, the matching of the device data with the subscription condition set is performed according to the attribute elements during the process of pushing the subscription data, such that the matching of the device data is stopped in the case that one attribute element fails to meet the subscription condition set, which can reduce waste of matching resources of the subscription server and thereby improve matching efficiency of the subscription server.

Figure 8:
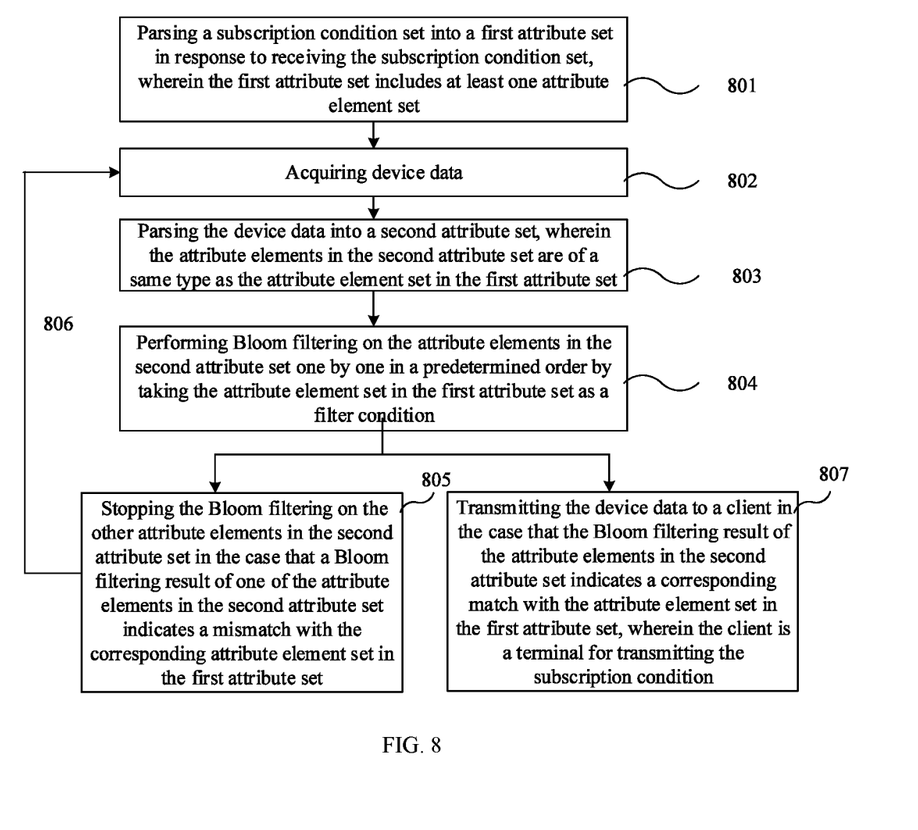
FIG. 8 is a flow chart of a method for pushing subscription data in Internet of things according to an exemplary embodiment of the present disclosure.

Referring to FIG. 8, a flowchart of a method for pushing subscription data in IoT according to an exemplary embodiment of the present disclosure is illustrated. The method for pushing subscription data in IoT is performed by the subscription server. As shown in FIG. 8, the method may include the following steps.

In step 801, a subscription condition set is parsed into a first attribute set in response to receiving the subscription condition set. The first attribute set includes at least one attribute element set, and the subscription condition set includes at least one subscription condition.

In some embodiments, the attribute element set in the first attribute set is at least one of a model, a device, and a measurement point. Each attribute element set correspondingly includes the corresponding attribute elements acquired by parsing all the subscription conditions in the subscription condition set. For example, a model set may include model elements acquired by parsing all the subscription conditions in the subscription condition set.

In some embodiments, each subscription condition has a corresponding subscriber account, and the subscriber account is used to instruct to transmit the device data that meets the corresponding subscription condition to the subscriber account.

In some embodiments, during the process of pushing the subscription data in IoT, the subscription server may receive a plurality of subscription conditions sent by the user in the same time period, when the number of subscription conditions is greater than 1, the subscription server parses the plurality of subscription conditions simultaneously to form the first attribute set, with one subscription condition corresponding to one subscriber account.

In step 802, the device data is acquired, wherein the device data is stored in the subscription server.

In step 803, the device data is parsed into a second attribute set. The attribute elements in the second attribute set are of the same type as the attribute element set in the first attribute set.

In step 804, the Bloom filtering is performed on the attribute elements in the second attribute set one by one in a predetermined order by taking the attribute element set in the first attribute set as a filter condition. The step may include following contents.

1) The Hash operation is performed on the attribute values of the attribute elements in the first attribute set to acquire a binary vector set corresponding to the attribute element set in the first attribute set. The process may include following steps.

In step S810, an operation result respectively corresponding to the attribute element set in the first attribute set is acquired by performing the Hash operation on the attribute values of the attribute element set in the first attribute set.

In step 820, an empty bitmap set is set up.

In step S830, the binary vector corresponding to the attribute element set in the first attribute set by setting the position in the bitmap set corresponding to the operation result respectively corresponding to the attribute element set in the first attribute set to 1.

Since the set-to-1 operation can be performed only once for each position, the positions set to 1 in the bitmap set may correspond to a plurality of subscription conditions due to characteristics of the Hash operation. Thus, it is possible to establish a correlation between the position set to 1 and the subscription condition, which may be implemented by establishing a correlation between the position set to 1 and the attribute element firstly.

2) The Hash operation is performed on the attribute values of the attribute elements in the second attribute set to acquire a binary vector corresponding to the attribute elements in the second attribute set.

The process of acquiring the binary vector corresponding to the attribute elements of the second attribute set may refer to steps S810 to S830, which is not described herein any further.

The process of performing the Hash operation on the attribute values of the attribute elements may refer to the workflow of the Bloom filter shown in FIG. 1 to FIG. 6.

During the Hash operation, the Hash function for performing the Hash operation on the attribute values of different attribute elements of the same subscription condition or the same device data may be the same or not, whereas the Hash function for performing the Hash operation on the attribute values of the corresponding attribute elements in the subscription condition and the device data needs to be the same. For example, if the parsing of the subscription condition includes three attribute elements, which are device, model, and measurement point, the corresponding parsing of the device data also includes three attribute elements, which are device, model, and measurement point. During the process of performing the Bloom filtering on the attribute elements, when the Hash functions for performing the Hash operation on the attribute values of the three attribute elements of the subscription condition are all Hash A, all the Hash functions for performing the Hash operation on the attribute values of the three attribute elements of the device data shall also be Hash A; and when the Hash functions for performing the Hash operation on the attribute values of the attribute elements, which are model, device, and measurement point, of the subscription condition are Hash A, Hash B, and Hash C, the Hash functions for performing the Hash operation on the attribute values of the attribute elements, which are model, device, and measurement point, of the device data shall also be Hash A, Hash B, and Hash C.

3) The binary vector set corresponding to the attribute element set in the first attribute set is matched with the binary vector corresponding to the attribute elements in the second attribute set respectively.

In some embodiments, during the matching process, a quantitative product of the binary vector corresponding to the attribute elements of the device data and the binary vector corresponding to the attribute elements of the subscription condition may be calculated, such that whether the attribute elements of the device data meet the subscription condition is determined according to the calculation result. When the calculation result is 1, it is determined that the attribute element of the device data meets the subscription condition; and when the calculation result is 0, it is determined that the attribute element of the device data fails to meet the subscription condition.

Figure 9:
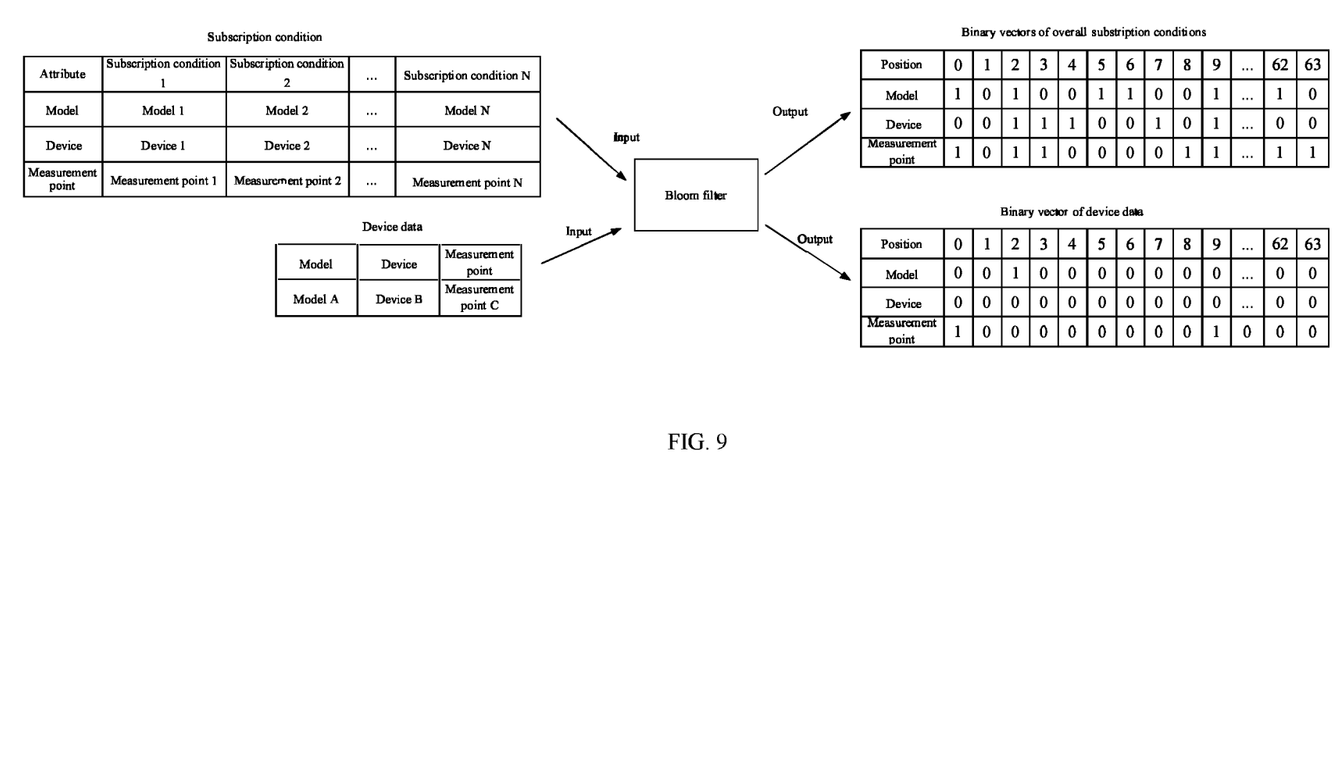
FIG. 9 is a schematic diagram of a corresponding binary vector after performing a Hash operation on attribute values of different attribute elements under a plurality of subscription conditions according to an embodiment of the present disclosure.

In some embodiments, when the number of subscription conditions is greater than 1, a reference is made to FIG. 9 that is a schematic diagram of a corresponding binary vector after performing the Hash operation on the attribute values of different attribute elements of a plurality of subscription conditions according to an embodiment of the present disclosure. As shown in FIG. 9, the size of the bitmap set is 64 bits. For the attribute values of the attribute elements in the subscription condition set in FIG. 9 after the Hash operation, the Hash value as output is a value within the integer range of 0 to 63, and the position in the bitmap set corresponding to the Hash value is set to 1.

As shown in FIG. 9, the binary vector corresponding to the model attribute of the overall subscription condition is [1,0,1,0,0,1,1,0,0,1 . . . 1,0], and the binary vector corresponding to the model attribute of the device data is [0,0, 1,0,0,0,0,0,0 . . . 0,0]. Thus, the quantitative product therebetween as calculated shall be

[1,0,1,0,0,1,1,0,0,1 . . . 1,0]×[0,0,1,0,0,0,0,0,0,0 . . . 0,0]=1.

Since the product result of the binary vectors corresponding to the model as matched between the device data and the overall subscription condition is 1, it is determined that the attribute values of the model of the device data meet the subscription condition.

If the binary vector corresponding to the model attribute of the device data is set as [0,1,0,0,0,0,0,0,0,0 . . . 0,0], the quantitative product as calculated shall be

[1,0,1,0,0,1,1,0,0,1 . . . 1,0]×[0,1,0,0,0,0,0,0,0,0 . . . 0,0]=0.

Since the product result of the binary vectors corresponding to the model attribute as matched between the device data and the overall subscription condition is 0, it is determined that the attribute values of the model of the device data fail to meet the subscription condition.

According to the matching result, step 805 or step 807 is performed.

In step 805, the Bloom filtering on the other attribute elements in the second attribute set is stopped in the case that a Bloom filtering result of one of the attribute elements in the second attribute set indicates a mismatch with the corresponding attribute element set in the first attribute set.

In some embodiments, the process may include: stopping the matching on the attribute elements in the second attribute set in the case that one of the binary vectors corresponding to the attribute elements in the second attribute set fails to match one of the binary vector sets corresponding to the attribute elements in the first attribute set, and then executing step 806.

In step 806, the process returns to the step of acquiring the device data.

In step 807, the device data is transmitted to a client in the case that the Bloom filtering result of the attribute elements in the second attribute set indicates a corresponding match with the attribute element set in the first attribute set. The client is a terminal for transmitting the subscription condition.

When the number of subscription conditions is 1, the subscription server may continuously transmit the device data to the client corresponding to the subscription condition when the Bloom filtering result of the attribute elements in the second attribute set indicates a match with the attribute element set in the first attribute set, which also means that the device data is successfully matched with the subscription condition, wherein the device data is the data that changes over time. For example, when the subscription condition is "acquiring photovoltaic power of a photovoltaic module 1 in a photovoltaic module model," the photovoltaic power value of the photovoltaic module 1 in the photovoltaic module model may increase or decrease with the influence of solar irradiance; and when the device data is successfully matched with the subscription condition, the subscription server may continuously transmit the photovoltaic power value uploaded by the photovoltaic module 1 to the client.

When the number of subscription conditions is greater than 1, since what is output by the Hash function is an integer within a certain range, the Hash values acquired by performing the Hash operation on the attribute values of the attribute elements of different subscription conditions may be duplicated, which thereby causes that one attribute element in the first attribute set may correspond to a plurality of subscription conditions. For example, the Hash function may be defined as:

$H(x)=h.$

H denotes a predetermined Hash function, x denotes the data having a variable size, and h denotes a calculated Hash value at a fixed length.

When the Hash function is a function taking a remainder of 2, the attribute values of the model attribute of a subscription condition 1 is 13, and the model attribute of a subscription condition 2 is 5, which may cause following results:

$H(13)=1;$ $H(5)=1.$

The result of taking the remainder of 5 to 2 is 1, which is same as the result of taking the remainder of 13 to 2. While, 5 is not equal to 13, which indicates that the subscription condition 1 differs from the subscription condition 2. In addition, since the results of the Hash operation are both 1, the results are both set to 1 at the position 1 in the corresponding bitmap set. However, since the set-to-1 operation can be performed only once at the same position, two subscription conditions associated with the set-to-1 operation are present at the position 1. Therefore, in order to avoid the inaccuracy in the judgment result caused by the collision of the Hash operation results, the following steps are performed.

1) A unified subscription condition is acquired by interesting the subscription condition sets corresponding to the attribute elements which are successfully matched in each first attribute set in the case that the Bloom filtering result of the attribute elements in the second attribute set indicates a corresponding match with the attribute element set in the first attribute set.

In some embodiments, in the case that the binary vector set corresponding to the attribute element set in the first attribute set is successfully matched with the binary vector corresponding to the attribute elements in the second attribute set, the subscription condition sets corresponding to the attribute elements which are successfully matched in each first attribute set are intersected to acquire the unified subscription condition.

Each subscription condition may have a corresponding subscription condition mark. When the subscription condition sets are intersected, the subscription condition marks corresponding to the attribute elements which are successfully matched in each first attribute set may be acquired, such that the subscription condition marks corresponding to the unified subscription condition may be acquired by intersecting the subscription condition marks corresponding to the attribute elements in the first attribute sets, thereby acquiring the unified subscription condition.

2) An attribute set corresponding to the unified subscription condition is matched with the second attribute set to acquire a matching result.

The attribute values of the attribute elements in the attribute set corresponding to the unified subscription condition are matched with the attribute values of the attribute elements in the second attribute set one by one.

3) The device data is transmitted to the client in response to the matching result indicating that the second attribute set is successfully matched with the attribute set corresponding to the unified subscription condition. The client is a client for transmitting the subscription condition.

In some embodiments, the position where the product result of the binary vector corresponding to the attribute values of the model attribute of the device data and the binary vector corresponding to the model attribute of the overall subscription condition is 1 is position 0, and the subscription condition set composed of subscription conditions associated with the position 0 is [subscription condition 1, subscription condition 2]; the position where the product result of the binary vector corresponding to the attribute values of the device attribute of the device data and the binary vector corresponding to the device attribute of the overall subscription condition is 1 is position 2, and the subscription condition set composed of subscription conditions associated with the position 2 is [subscription condition 3, subscription condition 4]; and the position where the product result of the binary vector corresponding to the attribute values of the measurement point attribute of the device data and the binary vector corresponding to the measurement point of the overall subscription condition is 1 is position 1, and the subscription condition set composed of subscription conditions associated with the position 1 is [subscription condition 4, subscription condition 2]. By intersecting the above three the subscription condition sets, the unified subscription condition may be acquired as a set of [subscription condition 2].

Then, the attribute set corresponding to the unified subscription condition is matched with the second attribute set, and the number of users corresponding to the unified subscription condition may be one or greater than one. In the environment of the IoT, different users may simultaneously input different subscription conditions to match different device data, or different users may input the same subscription condition to match the same device data. In addition, the subscription conditions input by different users may correspond to the account of the user. Thus, when the matching result between the attribute set of the data device and the attribute set corresponding to the unified subscription condition indicates a successful matching, the subscription server may transmit the device data to the client indicated by the corresponding account according to the one or more accounts corresponding to different subscription conditions.

In summary, in the method for pushing subscription data in IoT according to the embodiment of the present disclosure, when a subscription condition set is received, the subscription condition set is parsed into a first attribute set, and the device data is acquired and parsed into a second attribute set that has the same type of attribute elements as the attribute element set in the first attribute set. Then, the Bloom filtering is performed on the attribute elements in the second attribute set one by one in a predetermined order by taking an attribute element set in the first attribute set as a filter condition, and the Bloom filtering on the other attribute elements in the second attribute set is stopped in the case that a Bloom filter result of one of the attribute elements in the second attribute set indicates a mismatch with the corresponding attribute element set in the first attribute set. At this point, the step of acquiring the device data is returned. In this way, the device data is matched with the subscription condition according to the attribute elements during the process of pushing the subscription data, such that the matching of the device data is stopped in the case that one attribute element fails to meet the subscription condition, which can reduce waste of matching resources of the subscription server and thereby improve matching efficiency of the subscription server.

Figure 10:
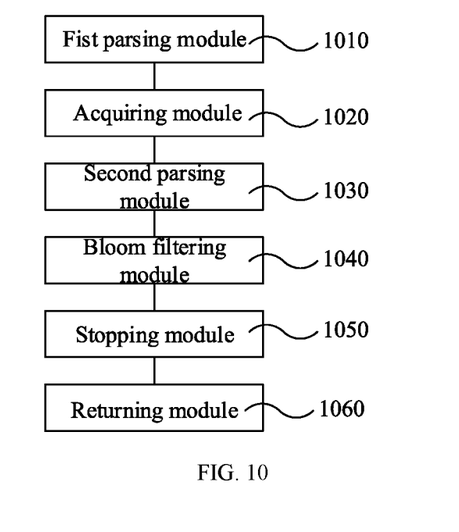
FIG. 10 is a block diagram of an apparatus for pushing subscription data in Internet of things according to an exemplary embodiment of the present disclosure.

Referring to FIG. 10, a block diagram of an apparatus for pushing subscription data in IoT according to an exemplary embodiment of the present disclosure is illustrated. The apparatus may be practiced as all or a part of the data verification server in the form of software to implement all or a part of the steps of the method shown in FIG. 7 or FIG. 8 and the corresponding embodiment. As shown in FIG. 10, the apparatus may include: a first parsing module 1010, an acquiring module 1020, a second parsing module 1030, a Bloom filtering module 1040, a stopping module 1050, and a returning module 1060.

The first parsing module 1010 is configured to parse a subscription condition set into a first attribute set in response to receiving the subscription condition set, wherein the first attribute set includes at least one attribute element set.

The acquiring module 1020 is configured to acquire device data, wherein the device data is stored in the subscription server.

The second parsing module 1030 is configured to parse the device data into a second attribute set, wherein the attribute elements in the second attribute set are of the same type as the attribute element set in the first attribute set.

The Bloom filtering module 1040 is configured to perform Bloom filtering on the attribute elements in the second attribute set one by one in a predetermined order by taking the attribute element set in the first attribute set as a filter condition.

The stopping module 1050 is configured to stop the Bloom filtering on the other attribute elements in the second attribute set in the case that a Bloom filtering result of one of the attribute elements in the second attribute set indicates a mismatch with the corresponding attribute element set in the first attribute set.

The returning module 1060 is configured to return to the step of acquiring the device data.

In some embodiments, the Bloom filtering module 1040 includes a first calculating submodule and a second calculating submodule.

The first calculating submodule is configured to acquire a binary vector set corresponding to the attribute element set in the first attribute set by performing a Hash operation on attribute values of the attribute elements in the first attribute set.

The second calculating submodule is configured to acquire a binary vector corresponding to the attribute elements in the second attribute set by performing a Hash operation on attribute values of the attribute elements in the second attribute set.

The stopping module 1050 is configured to stop the Bloom filtering on the other attribute elements in the second attribute set in the case that one of the binary vectors corresponding to the attribute elements in the second attribute set fails to match one of the binary vector sets corresponding to the attribute elements in the first attribute set.

In some embodiments, in the case that the number of subscription conditions is 1, the apparatus further includes a first transmitting module.

The first transmitting module is configured to transmit the device data to a client in the case that the Bloom filtering result of the attribute elements in the second attribute set indicates a corresponding match with the attribute element set in the first attribute set, wherein the client is a terminal for transmitting the subscription condition.

In some embodiments, in the case that the number of subscription conditions is greater than 1, the apparatus further includes: a calculating module, a matching module, and a second transmitting module.

The calculating module is configured to acquire a unified subscription condition by intersecting the subscription condition sets corresponding to the attribute elements that are successfully matched in the case that the Bloom filtering result of the attribute elements in the second attribute set indicates a corresponding match with the attribute element set in the first attribute set.

The matching module is configured to acquire a matching result by matching an attribute set corresponding to the unified subscription condition with the second attribute set.

The second transmitting module is configured to transmit the device data to the client in response to the matching result indicating that the second attribute set is successfully matched with the attribute set corresponding to the unified subscription condition.

In some embodiments, the calculating module is configured to acquire the unified subscription condition by intersecting the subscription condition sets corresponding to the attribute elements which are successfully matched in the first attribute sets in the case that the binary vector set corresponding to the attribute element set in the first attribute set is successfully matched with the binary vector corresponding to the attribute elements in the second attribute set.

In some embodiments, the attribute element set in the first attribute set is at least one of a model, a device, and a measurement point.

In summary, in the apparatus for pushing subscription data in IoT according to the embodiment of the present disclosure, which is implemented as all or a part of the subscription server in the form of software, when a subscription condition set is received, the subscription condition set is parsed into a first attribute set, and the device data is acquired and parsed into a second attribute set that has the same type of attribute elements as the attribute element set in the first attribute set. Then, the Bloom filtering is performed on the attribute elements in the second attribute set one by one in a predetermined order by taking an attribute element set in the first attribute set as a filter condition, and the Bloom filtering on the other attribute elements in the second attribute set is stopped in the case that a Bloom filter result of one of the attribute elements in the second attribute set indicates a mismatch with the corresponding attribute element set in the first attribute set. At this point, the step of acquiring the device data is returned. In this way, the matching of the device data with the subscription condition set is performed according to the attribute elements during the process of pushing the subscription data, such that the matching of the device data is stopped in the case that one attribute element fails to meet the subscription condition set, which can reduce waste of matching resources of the subscription server and thereby improve matching efficiency of the subscription server.

Figure 11:
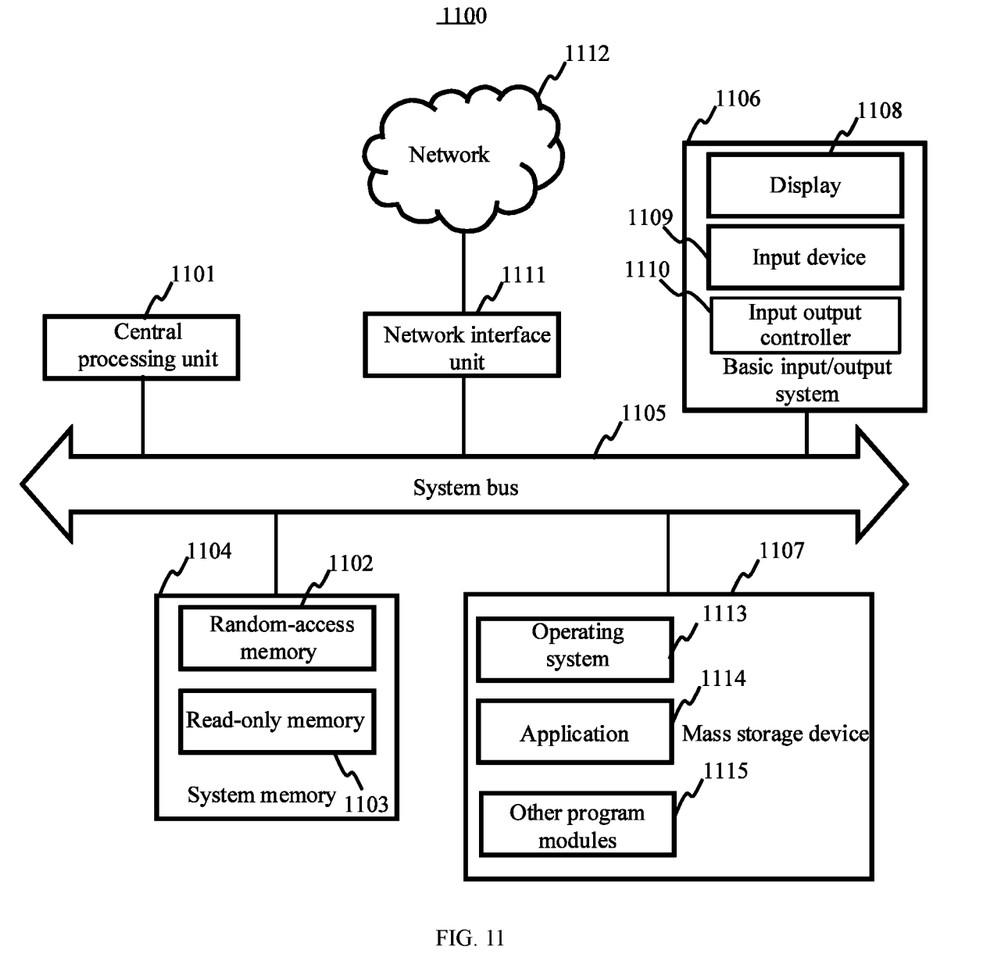
FIG. 11 is a schematic block diagram of a structure of a computer device according to an exemplary embodiment.

Referring to FIG. 11, a schematic diagram of a structure of a computer device 1100 according to an exemplary embodiment is illustrated. The computer device may be implemented as the subscription server stated in the aforesaid solution of the present disclosure. The computer device 1100 includes a central processing unit (CPU) 1101, a system memory 1104 including a random-access memory (RAM) 1102 and a read-only memory (ROM) 1103, and a system bus 1105 that connects the system memory 1104 and the central processing unit 1101. The computer device 1100 further includes a basic input/output system (I/O system) 1106 that facilitates to transfer the information between respective devices within the computer, and a mass storage device 1107 for storing an operating system 1113, an application 1114, and other program modules 1115.

The basic input/output system 1106 includes a display 1108 for displaying the information and an input device 1109, such as a mouse or keyboard, for the user to input information. The display 1108 and the input device 1109 are both connected to the CPU 1101 via an input output controller 1110 that is connected to the system bus 1105. The basic I/O system 1106 may further include an input output controller 1110 for receiving and processing the input from a plurality of other devices, such as a keyboard, mouse, or electronic stylus. Similarly, the input and output controller 1110 further provides output to a display screen, a printer, or other types of output devices.

The mass storage device 1107 is connected to the CPU 1101 by a mass storage controller (not shown) connected to the system bus 1105. The mass storage device 1107 and the related computer-readable mediums provide non-volatile storage for the server 1100. That is, the mass storage device 1107 may include a computer-readable medium (not shown), such as, a hard disk or a compact disc read-only memory (CD-ROM) drive.

Without loss of generality, the computer-readable medium may include a computer storage medium and a communication medium. The computer storage medium includes volatile and nonvolatile, removable and non-removable mediums implemented by any method or technology for storing the information, such as, computer-readable instructions, data structures, program modules or other data. The computer storage medium includes a RAM, a ROM, an erasable programmable read-only memory (EPROM), an electrically erasable programmable read-only memory (EEPROM), a flash memory or other solid-state storage technology, and a CD-ROM, a digital versatile disc (DVD), or other optical storage devices, or a tape cassette, a magnetic tape, a disk storage or other magnetic storage devices. A person skilled in the art will appreciate that the computer storage medium is not limited to the above ones. The aforesaid system memory 1104 and mass storage device 1107 may be collectively referred to as a memory.

According to various embodiments of the present disclosure, the computer device 1100 may further be operated by a remote computer connected to the network over the network such as the Internet. That is, the computer device 1100 may be connected to the network 1112 by a network interface unit 1111 connected to the system bus 1105, or may be connected to other types of networks or remote computer systems (not shown) by the network interface unit 1111.

The memory further stores one or more programs, wherein the one or more programs are stored in the memory, when run by the CPU 1101, causes the CPU 1101 to perform all or a part of the steps in the method shown in FIG. 7 or FIG. 8.

A person skilled in the art shall appreciate that in one or more examples described above, the functions described in the embodiments of the present disclosure may be implemented in hardware, software, firmware, or any combination thereof. If the functions are implemented in the software, they may be stored in a computer-readable medium or transmitted as one or more instructions or codes on a computer-readable medium. The computer-readable medium includes a computer storage medium and a communication medium, wherein the communication medium includes any medium that facilitates transfer of a computer program from one place to another, and the storage medium may be any available medium that can be accessed by a general-purpose or special-purpose computer.

An embodiment of the present disclosure further provides a non-transitory computer-readable storage medium storing at least one instruction, at least one program, a code set, or an instruction set. The at least one instruction, the at least one program, the code set, or the instruction set, when loaded and executed by a processor of a computer device, causes the computer device to perform the method for pushing subscription data in IoT. For example, the computer-readable storage medium may be a ROM, a RAM, a CD-ROM, a magnetic tape, a floppy disk, an optical data storage device, or the like.

Other embodiments of the present disclosure are apparent to those skilled in the art from consideration of the specification and practice of the present disclosure. The present disclosure is intended to cover any variations, uses, or adaptations of the present disclosure following the general principles thereof and including common knowledge or commonly used technical means which are not disclosed herein. The specification and embodiments are to be considered as exemplary only, and the scope and spirit of the present disclosure are subject to the appended claims.

It will be appreciated that the present disclosure is not limited to the exact construction that has been described above and illustrated in the accompanying drawings, and that various modifications and changes can be made without departing from the scope thereof. It is intended that the scope of the present disclosure is only limited by the appended claims.

What is claimed is:

1. A method for pushing subscription data in Internet of things, wherein the method is performed by a subscription server, and comprises:
    parsing a subscription condition set into a first attribute set in response to receiving the subscription condition set, wherein the first attribute set comprises at least one attribute element set, and the subscription condition set comprises at least one subscription condition;
    acquiring device data, wherein the device data is stored in the subscription server;
    parsing the device data into a second attribute set, wherein attribute elements in the second attribute set are of a same type as the attribute element set in the first attribute set;
    performing Bloom filtering on the attribute elements in the second attribute set one by one in a predetermined order by taking the attribute element set in the first attribute set as a filter condition by:
        acquiring a binary vector set corresponding to the attribute element set in the first attribute set by performing a Hash operation on attribute values of the attribute elements in the first attribute set respectively;
        acquiring a binary vector corresponding to the attribute elements in the second attribute set by performing a Hash operation on attribute values of the attribute elements in the second attribute set respectively; and
        matching the binary vector set corresponding to the attribute element set in the first attribute set with the binary vector corresponding to the attribute elements in the second attribute set in a predetermined matching order;
    stopping the Bloom filtering on the other attribute elements in the second attribute set in the case that one of binary vectors corresponding to the attribute elements in the second attribute set fails to match one of binary vector sets corresponding to the attribute elements in the first attribute set; and
    returning to the step of acquiring the device data.

2. The method according to claim 1, wherein in the case that a number of subscription conditions is 1, the method further comprises:
    transmitting the device data to a client in the case that the Bloom filtering result of the attribute elements in the second attribute set indicates a corresponding match with the attribute element set in the first attribute set, wherein the client is a terminal for transmitting the subscription condition.

3. The method according to claim 1, wherein in the case that a number of subscription conditions is greater than 1, the method further comprises:
    acquiring a unified subscription condition by intersecting subscription condition sets corresponding to the attribute elements which are successfully matched in the first attribute sets in the case that that the Bloom filtering result of the attribute elements in the second attribute set indicates a corresponding successful match with the attribute element set in the first attribute set;
    acquiring a matching result by matching an attribute set corresponding to the unified subscription condition with the second attribute set; and
    transmitting the device data to a client in response to the matching result indicating that the second attribute set is successfully matched with the attribute set corresponding to the unified subscription condition.

4. The method according to claim 3, wherein acquiring the unified subscription condition by intersecting the subscription condition sets corresponding to the attribute elements which are successfully matched in the first attribute sets in the case that that the Bloom filtering result of the attribute elements in the second attribute set indicates the corresponding successful match with the attribute element set in the first attribute set comprises:
    acquiring the unified subscription condition by intersecting the subscription condition sets corresponding to the attribute elements which are successfully matched in the first attribute sets in the case that a binary vector set corresponding to the attribute element set in the first attribute set is successfully matched with a binary vector corresponding to the attribute elements in the second attribute set.

5. The method according to claim 1, wherein the attribute element set in the first attribute set is at least one of a model, a device, and a measurement point.

6. A computer device, comprising a processor and a memory storing at least one instruction, at least one program, a code set, or an instruction set therein, wherein the at least one instruction, the at least one program, the code set, or the instruction set, when loaded and executed by the processor, causes the processor to perform the method for pushing subscription data in Internet of things as defined in claim 1.

7. A non-transitory computer-readable storage medium, storing at least one instruction, at least one program, a code set, or instruction set, wherein the at least one instruction, the at least one program, the code set, or the instruction set, when loaded and executed by a processor of computer device, causes the computer device to perform the method for pushing subscription data in Internet of things as defined in claim 1.

8. A server for pushing subscription data in Internet of things comprising:
    a processor for executing a program; the program comprising:
        a first parsing module, configured to parse a subscription condition set into a first attribute set in response to receiving the subscription condition set, wherein the first attribute set comprises at least one attribute element set, and the subscription condition set comprises at least one subscription condition;

an acquiring module, configured to acquire device data, wherein the device data is stored in the subscription server;

a second parsing module, configured to parse the device data into a second attribute set, wherein attribute elements in the second attribute set are of a same type as the attribute element set in the first attribute set;

a Bloom filtering module, configured to perform Bloom filtering on the attribute elements in the second attribute set one by one in a predetermined order by taking the attribute element set in the first attribute set as a filter condition; the Bloom filtering module comprising:

a first calculating submodule, configured to acquire a binary vector set corresponding to the attribute element set in the first attribute set by performing a Hash operation on attribute values of the attribute elements in the first attribute set; and a second calculating submodule, configured to acquire a binary vector corresponding to the attribute elements in the second attribute set by performing a Hash operation on attribute values of the attribute elements in the second attribute set;

a stopping module, configured to stop the Bloom filtering on the other attribute elements in the second attribute set in the case that one of the binary vectors corresponding to the attribute elements in the second attribute set fails to match one of the binary vector sets corresponding to the attribute elements in the first attribute set; and a returning module, configured to return to the step of acquiring the device data.

* * * * *